Jan. 19, 1926.
V. LAMBERTI
HEDGE TRIMMER
Filed August 19, 1925
1,569,987
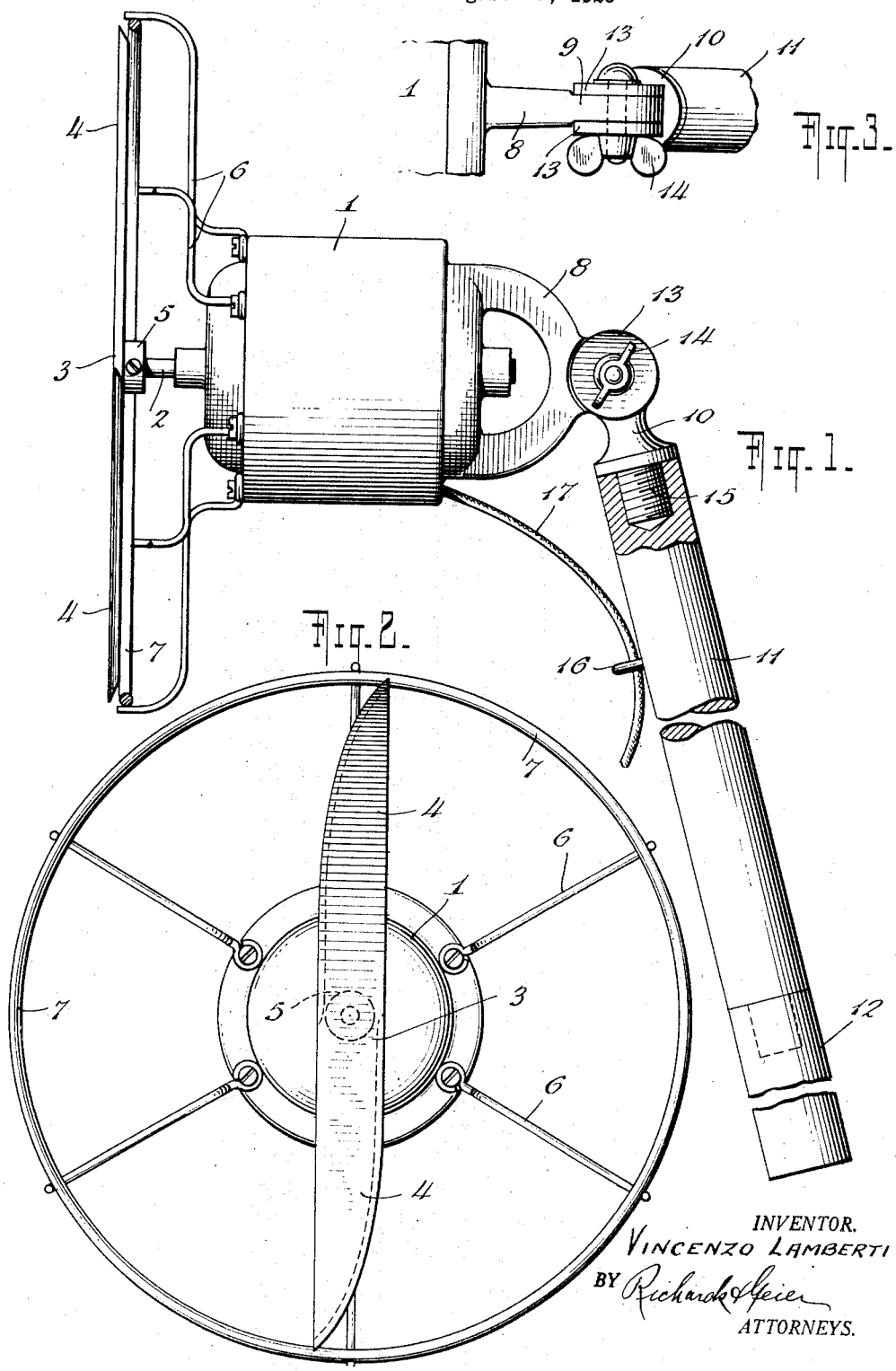
INVENTOR.
VINCENZO LAMBERTI
BY Richards & Geier
ATTORNEYS.

Patented Jan. 19, 1926.

1,569,987

UNITED STATES PATENT OFFICE.

VINCENZO LAMBERTI, OF BROOKLYN, NEW YORK.

HEDGE TRIMMER.

Application filed August 19, 1925. Serial No. 51,087.

*To all whom it may concern:*

Be it known that I, VINCENZO LAMBERTI, a subject of the King of Italy, residing at Brooklyn, county of Kings and State of New York, have invented certain new and useful Improvements in Hedge Trimmers, of which the following is a specification.

This invention relates to improvements in hedge trimmers and has particular reference to a motor driven trimmer.

An object of the invention is to provide an improved trimmer of simple and inexpensive construction which may be easily manipulated and which will effectively cut a hedge or the like.

The above and other objects will appear more clearly from the following description when taken in connection with the accompanying drawing which illustrates a preferred embodiment of the inventive idea.

In the drawing:

Figure 1 is a side elevation, partly in section, of the trimmer constructed in accordance with the invention.

Fig. 2 is a fragmentary front elevation and

Fig. 3 is a fragmentary plan view.

Referring more particularly to the drawing, the numeral 1 indicates an electric motor of any desired construction having the usual shaft 2. A rotary cutter 3 including the opposed blades 4 having their cutting edges on opposite longitudinal edges of the cutter and each cutting edge extending the entire length of its blade, is provided medially its ends with a hub 5 adapted to be secured to the end of the shaft 2.

A guard for the cutter is provided which consists of a plurality of outwardly extending fingers 6, having their inner ends secured to the motor casing and their outer ends connected by a ring 7, the diameter of which is substantially equal to the length of the cutter which rotates in close proximity to said ring.

At the end of the motor casing, remote from the cutter, said casing is provided with a bracket 8, terminating in a reduced extension 9. This extension forms the pivot of a handle consisting of sections 10, 11 and 12. The inner section 10 is bifurcated to form lugs 13, which receive therebetween the extension 9 and a bolt is extended through said parts about which the handle may be adjusted to various angular positions. A wing nut is threaded on the bolt to secure the parts in their adjusted positions.

The section 10 is provided with a screw threaded extension 15, engageable in a socket in the adjacent end of the section 11 and the section 12 is similarly connected to the section 11. By means of this construction it will be apparent that the handle may be shortened or lengthened to suit the convenience of the user.

The section 11 is provided with an eye 16 through which a conductor 17 for the motor is passed.

The conductor may be connected to the ordinary house current supply or to any suitable portable apparatus utilized to generate the current supply.

What is claimed is:

A hedge trimmer including a motor, a guard carried by said motor, and including an annular ring, a cutter having a hub mounted upon the shaft of said motor, said cutter also having opposed blades extending from said hub to the periphery of said ring, a bracket carried by said motor and having an extension, a sectional handle having one of the sections thereof pivoted to said extension to permit of various angular adjustments of the handle relative to said motor, and means for securing said handle in its adjusted position.

In testimony whereof I have affixed my signature.

VINCENZO LAMBERTI.